(12) United States Patent
Radhakrishnan et al.

(10) Patent No.: US 7,355,836 B2
(45) Date of Patent: Apr. 8, 2008

(54) ARRAY CAPACITOR FOR DECOUPLING MULTIPLE VOLTAGE RAILS

(75) Inventors: Kaladhar Radhakrishnan, Chandler, AZ (US); Nicholas L Holmberg, Gilbert, AZ (US); Joel A Auernheimer, Phoenix, AZ (US); Dustin P Wood, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 227 days.

(21) Appl. No.: 11/146,587

(22) Filed: Jun. 7, 2005

(65) Prior Publication Data

US 2006/0274479 A1 Dec. 7, 2006

(51) Int. Cl.
*H01G 4/228* (2006.01)

(52) U.S. Cl. .................. 361/306.2; 361/306.1; 361/306.3; 361/321.1; 361/311; 361/313

(58) Field of Classification Search ............ 361/306.2, 361/306.1, 306.3, 321.1, 321.2, 321.4, 421.5, 361/311–313
See application file for complete search history.

(56) References Cited

U.S. PATENT DOCUMENTS

| | | | |
|---|---|---|---|
| 5,422,782 A * | 6/1995 | Hernandez et al. ...... | 361/306.2 |
| 6,346,743 B1 * | 2/2002 | Figueroa et al. ............ | 257/723 |
| 6,370,010 B1 * | 4/2002 | Kuroda et al. ........... | 361/306.1 |
| 6,407,904 B1 * | 6/2002 | Kuroda et al. .............. | 361/303 |
| 6,407,907 B1 * | 6/2002 | Ahiko et al. ............. | 361/306.3 |
| 6,606,237 B1 * | 8/2003 | Naito et al. .............. | 361/306.3 |
| 6,961,230 B2 * | 11/2005 | Otsuka et al. ........... | 361/306.2 |
| 6,961,231 B1 * | 11/2005 | Alexander et al. ....... | 361/321.2 |
| 6,970,362 B1 * | 11/2005 | Chakravorty .............. | 361/782 |
| 2006/0067030 A1 | 3/2006 | Radhakrishnan et al. | |

* cited by examiner

*Primary Examiner*—Nguyen T. Ha
(74) *Attorney, Agent, or Firm*—Kenneth A. Nelson

(57) ABSTRACT

An array capacitor is provided. The array capacitor includes a plurality of ground planes inside a dielectric substrate, and a plurality of ground vias. The ground vias electrically connect the ground planes together. Further, the ground vias are connected to ground terminals of the array capacitor to enable electrical coupling between the ground planes and the ground terminals. The array capacitor further includes a plurality of power planes inside the dielectric substrate. The power planes and the ground planes are arranged alternatively inside the dielectric substrate. Each power plane comprises a plurality of power-plane-sections which are mutually electrically isolated. The array capacitor also includes a plurality of power vias which electrically connect the power planes together. Further, the power vias are connected to power terminals of the array capacitor to enable electrical coupling between the power planes and power terminals.

30 Claims, 9 Drawing Sheets

ARRAY CAPACITOR FOR DECOUPLING MULTIPLE VOLTAGE RAILS

BACKGROUND

Embodiments of the invention generally relate to integrated circuits. More specifically, the embodiments of the invention relate to array capacitors that are used in integrated circuits.

In known integrated circuits, a capacitor, such as a discrete array capacitor, is used to decouple the noise present on a power rail. Typically, when discrete capacitors are used to decouple the noise on multiple power rails, one or more discrete capacitors are used for each power rail. The capacitors can store charge and supply current on a temporary basis until the current supply kicks in. In addition, in known integrated circuits a plurality of discrete capacitors is used to decouple multiple voltage rails.

As microprocessor speeds increase, there is a demand for high performance decoupling capacitors. One such capacitor is the array capacitor which has significantly larger number of terminals and has better performance than standard discrete capacitors. For example, in case of a semiconductor device, which may include a plurality of voltage rails such as an Input/Output (I/O) voltage rail, a core voltage rail, and a cache voltage rail, a plurality of array capacitors can be used to decouple the plurality of voltage rails. However, there are often design criteria that restrict how close the multiple array capacitors can be placed to each other, which can limit the amount of capacitance per unit area. Therefore, there is a need for a single array capacitor which can decouple multiple voltage rails.

BRIEF DESCRIPTION OF THE DRAWINGS

The various embodiments of the invention will hereinafter be described in conjunction with the appended drawings provided to illustrate and not to limit the invention, wherein like designations denote like elements, and in which.

DETAILED DESCRIPTION OF VARIOUS EMBODIMENTS

Various embodiments of the invention provide an array capacitor in which power planes are partitioned into a plurality of power-plane-sections. These power-plane-sections are electrically insulated from each other. The array capacitor can be used for decoupling multiple voltage rails instead of using multiple discrete array capacitors.

Figure 1A:
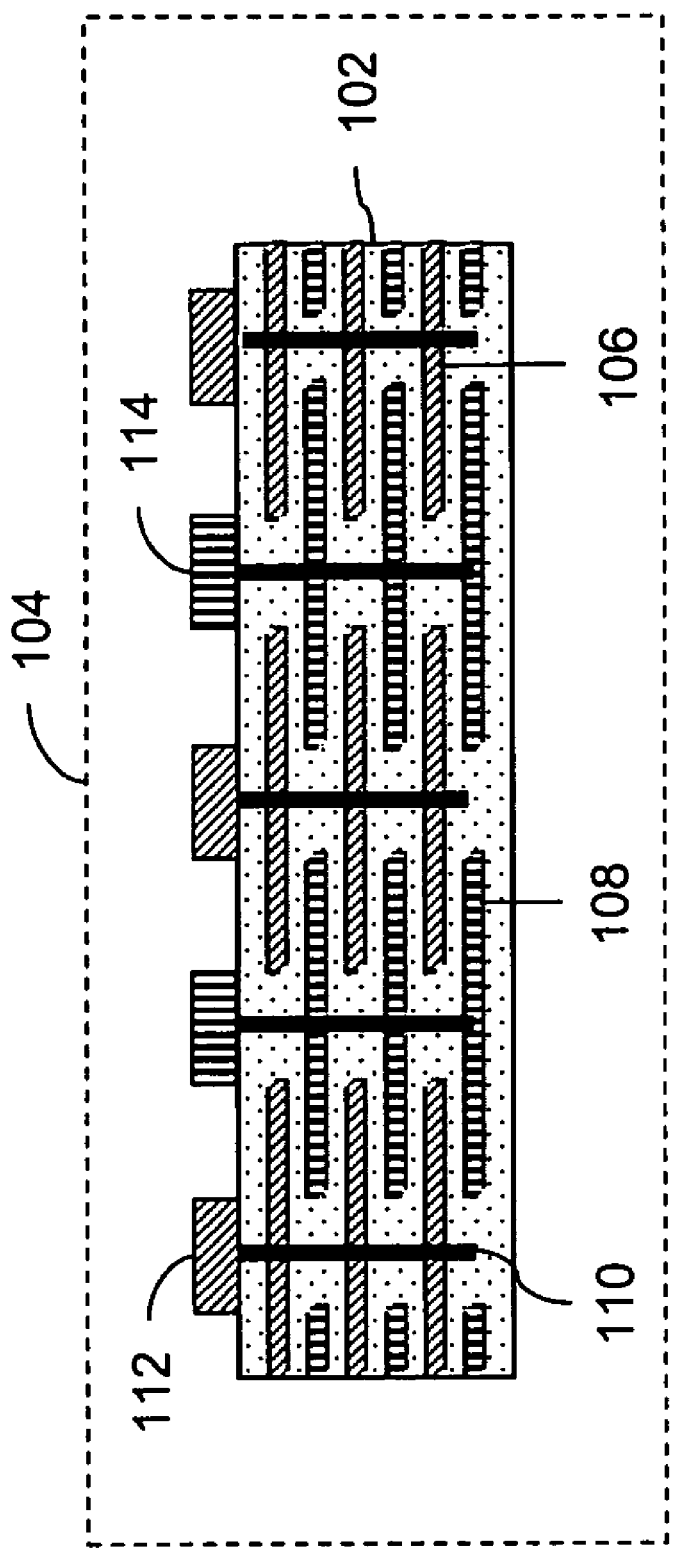
FIGS. 1A, 1B and 1C show an array capacitor, in accordance with the prior art.
Figure 1B:
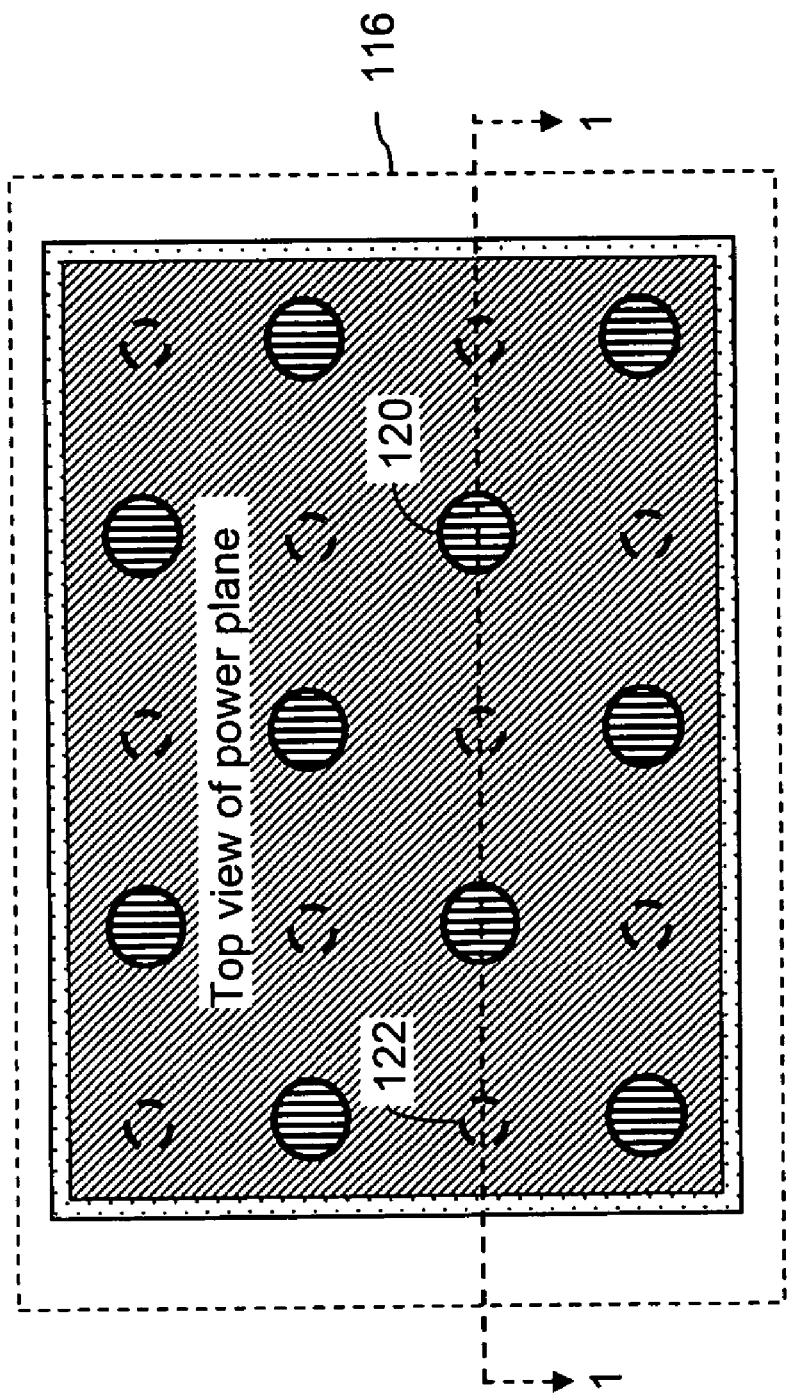
Figure 1C:
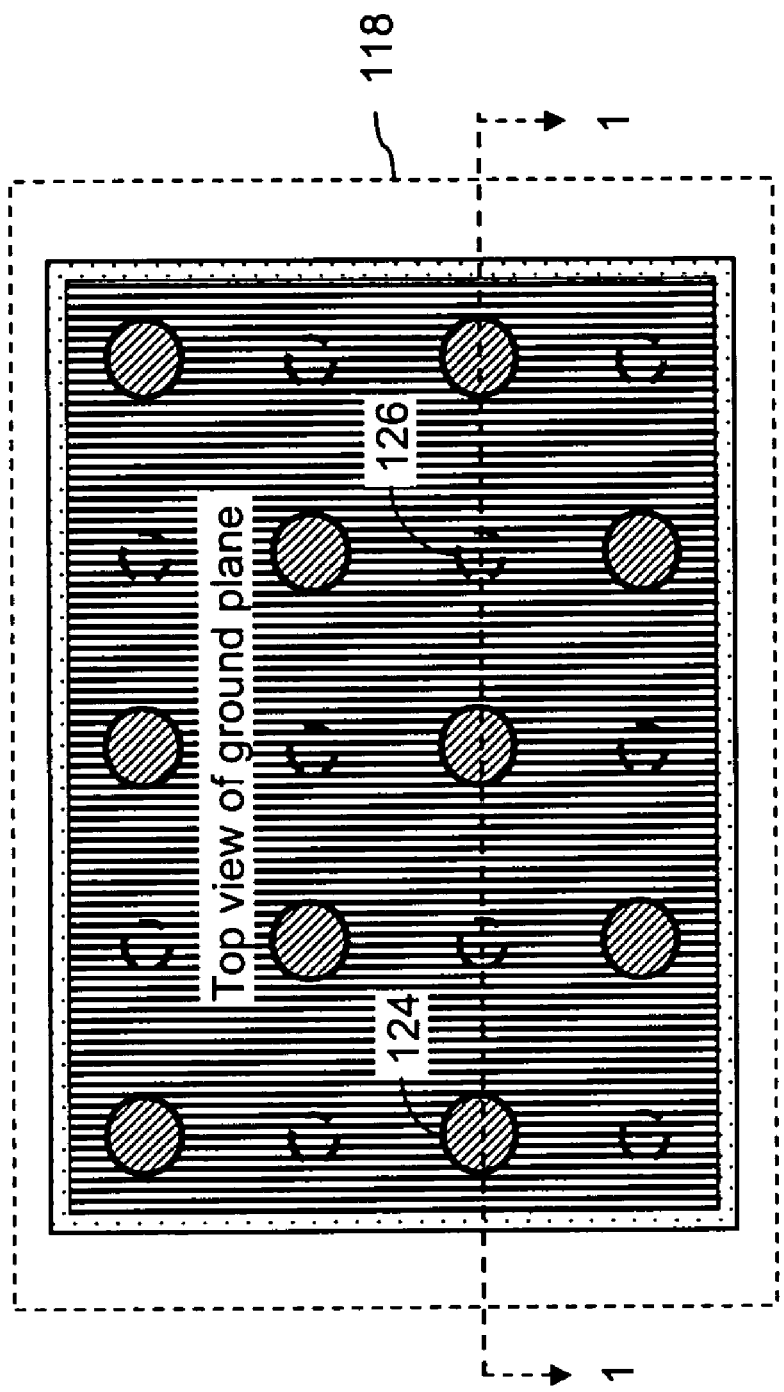

FIGS. 1A, 1B and 1C show an array capacitor 102, in accordance with the prior art. FIG. 1A shows a cross-sectional view 104 of array capacitor 102. Array capacitor 102 includes a plurality of power planes 106, a plurality of ground planes 108 and a plurality of vias 110 inside a dielectric substrate. Array capacitor 102 further includes a plurality of power terminals 112 and a plurality of ground terminals 114.

Power planes 106 and ground planes 108 are alternately arranged inside the dielectric substrate. Power planes 106 and ground planes 108 may include conducting materials such as metal sheets or alloy sheets.

Vias 110 include a plurality of power vias and a plurality of ground vias. The power vias electrically connect power planes 106 together. Further, the power vias are connected to power terminals 112 to enable electrical coupling between power planes 106 and power terminals 112. Similarly, the ground vias electrically connect ground planes 108 together and are connected to ground terminals 114. This enables electrical coupling between ground planes 108 and ground terminals 114.

FIG. 1B shows a top view 116 of power plane 106 and FIG. 1C shows a top view 118 of ground plane 108 of array capacitor 102. Further, cross-sectional view 104 is cut along section line 1-1. Holes 120 correspond to contact area on power plane 106 through which ground vias pass. Further, dashed circles 122 in top view 116 correspond to contact area on power plane 106 through which power vias are in contact with power plane 106. Similarly, holes 124 in top view 118 correspond to contact area on ground plane 108 through which power vias pass and dashed circles 126 correspond to contact area on ground plane 108 through which ground vias are in contact with ground plane 108.

Figure 2A:
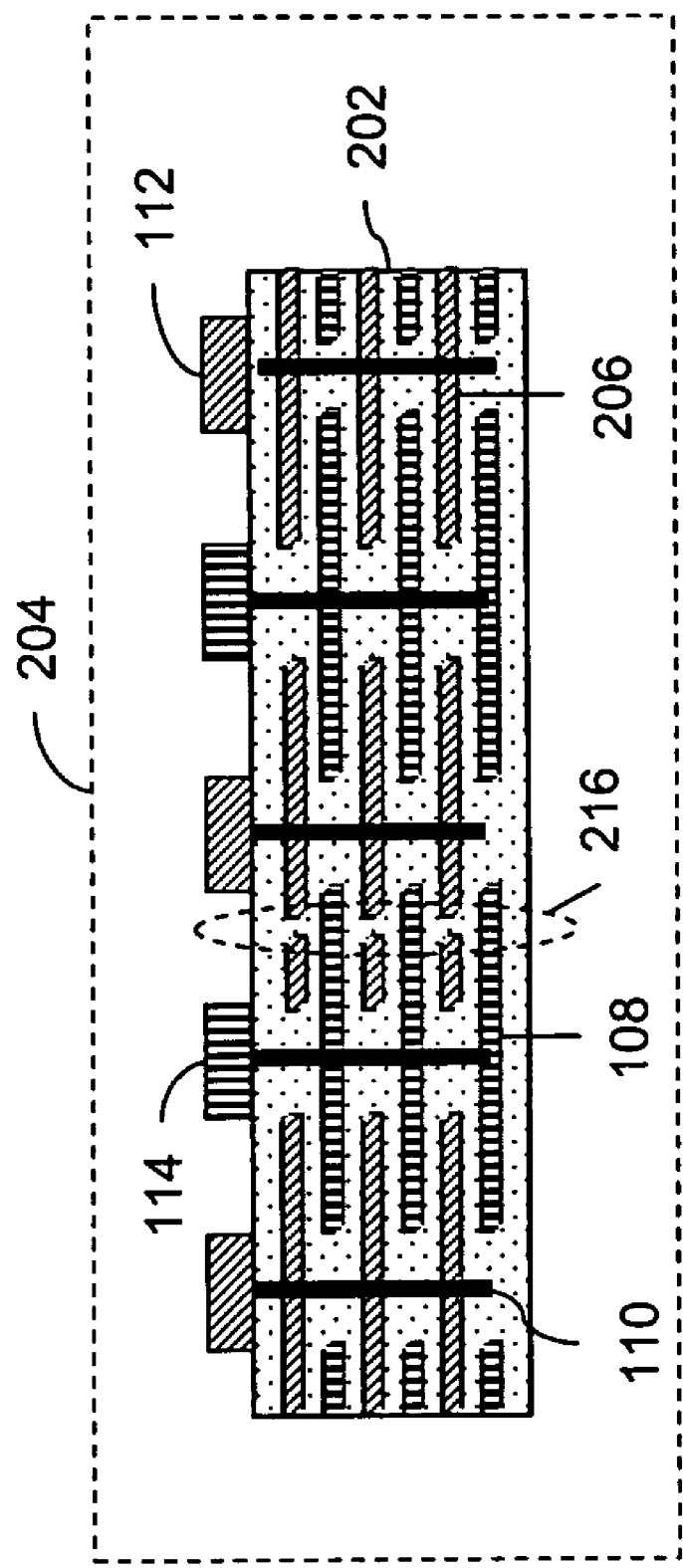
FIGS. 2A, 2B and 2C show an array capacitor, in accordance with an embodiment of the invention.
Figure 2B:
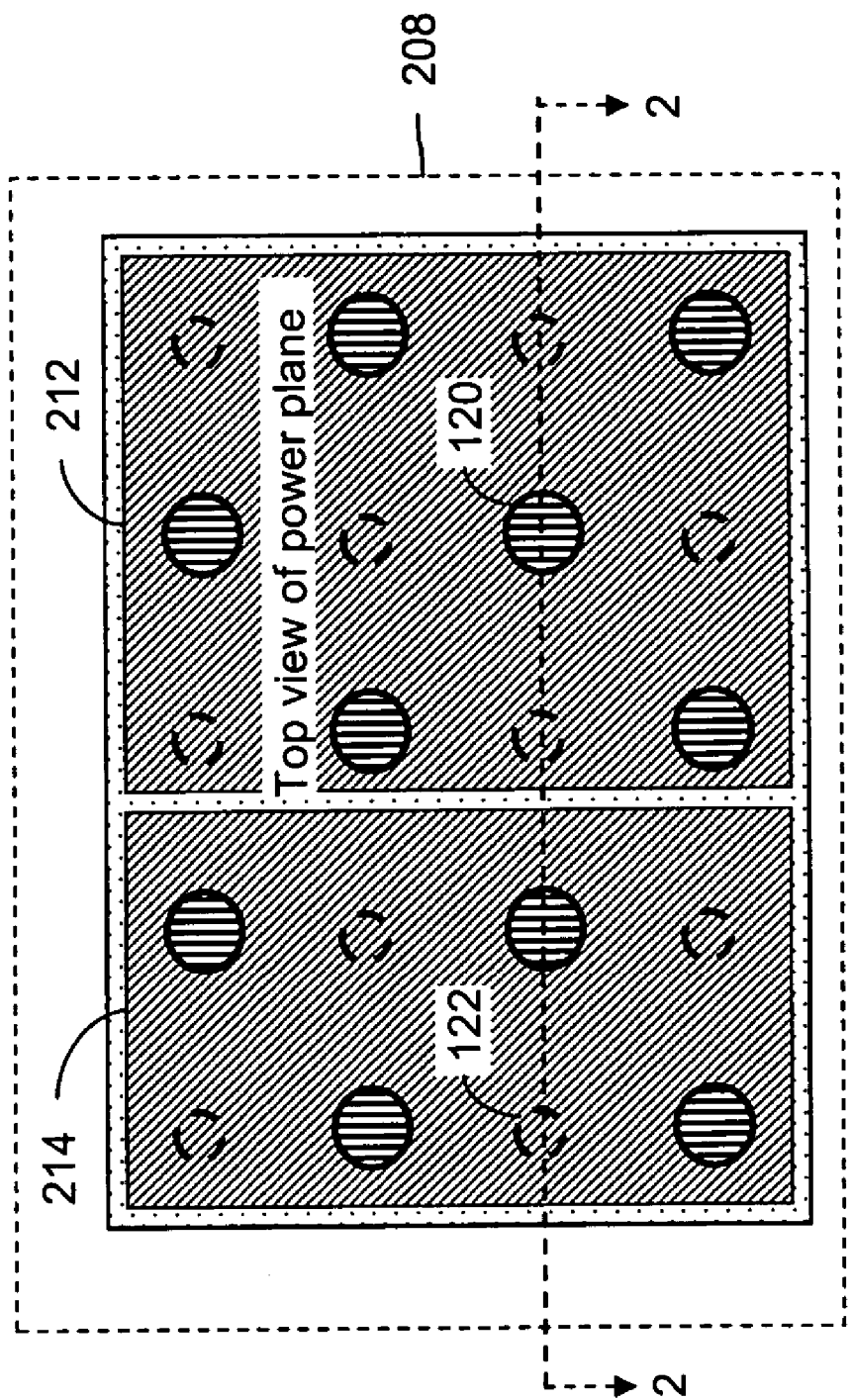
Figure 2C:
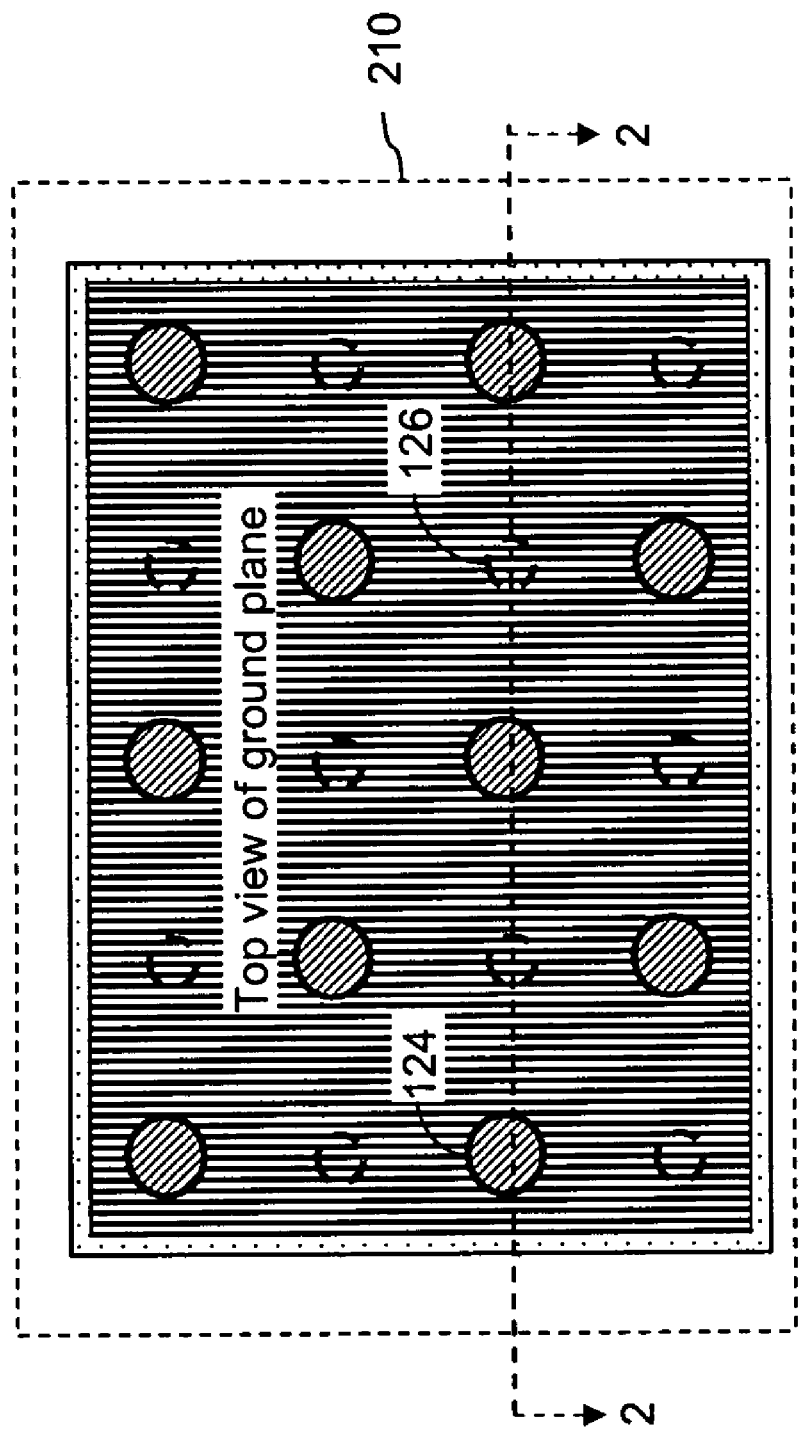

FIGS. 2A, 2B and 2C show an array capacitor 202, in accordance with an embodiment of the invention. FIG. 2A shows a cross-sectional view 204. Array capacitor 202 includes plurality of ground planes 108, plurality of vias 110 and a plurality of power planes 206 inside a dielectric substrate. Power planes 206 and ground planes 108 are alternately arranged inside the dielectric substrate.

Array capacitor 202 further includes plurality of power terminals 112 and plurality of ground terminals 114. In various embodiments of the invention, the dielectric substrate comprises a hi-k ceramic based substrate. Exemplary hi-k ceramic substrate may be for example, but not limited to, Barium Titanate (BaTiO3).

FIG. 2B shows a top view 208 of power plane 206 and FIG. 2C shows a top view 210 of ground plane 108 of array capacitor 202. Further, cross-sectional view 204 is cut along section line 2-2. Each power plane 206 includes a plurality of power-plane-sections which are mutually electrically insulated. In this embodiment of the invention, each power plane 206 includes a power-plane-section 212 and a power-plane-section 214. Further, power-plane-section 212 and power-plane-section 214 are electrically insulated from each other. In various embodiments of the invention, power-plane-section 212 and power-plane-section 214 may be independent metal sheets or alloy sheets. This is further highlighted in FIG. 2A with a gap 216.

In an embodiment of the invention, each power-plane-section is maintained at a different voltage. In another embodiment of the invention, each power-plane-section is maintained at a same voltage. The power-plane-sections may be maintained at the same voltage so as to minimize the noise coupling from between the power-plane-sections Further, the area of a power-plane-section may be different from other power-plane-sections. Therefore, different power-plane-sections may provide different capacitances. This reduces, or eliminates, the use of multiple array capacitors 102 in devices such as semiconductor devices that have multiple voltage rails.

In an embodiment of the invention, each ground plane 108 includes a plurality of ground-plane-sections which are mutually electrically insulated. These ground-plane-sections may be independent metal sheets or alloy sheets. Further, the ground-plane-sections may be substantially aligned to at least one corresponding power-plane-section.

Figure 3:
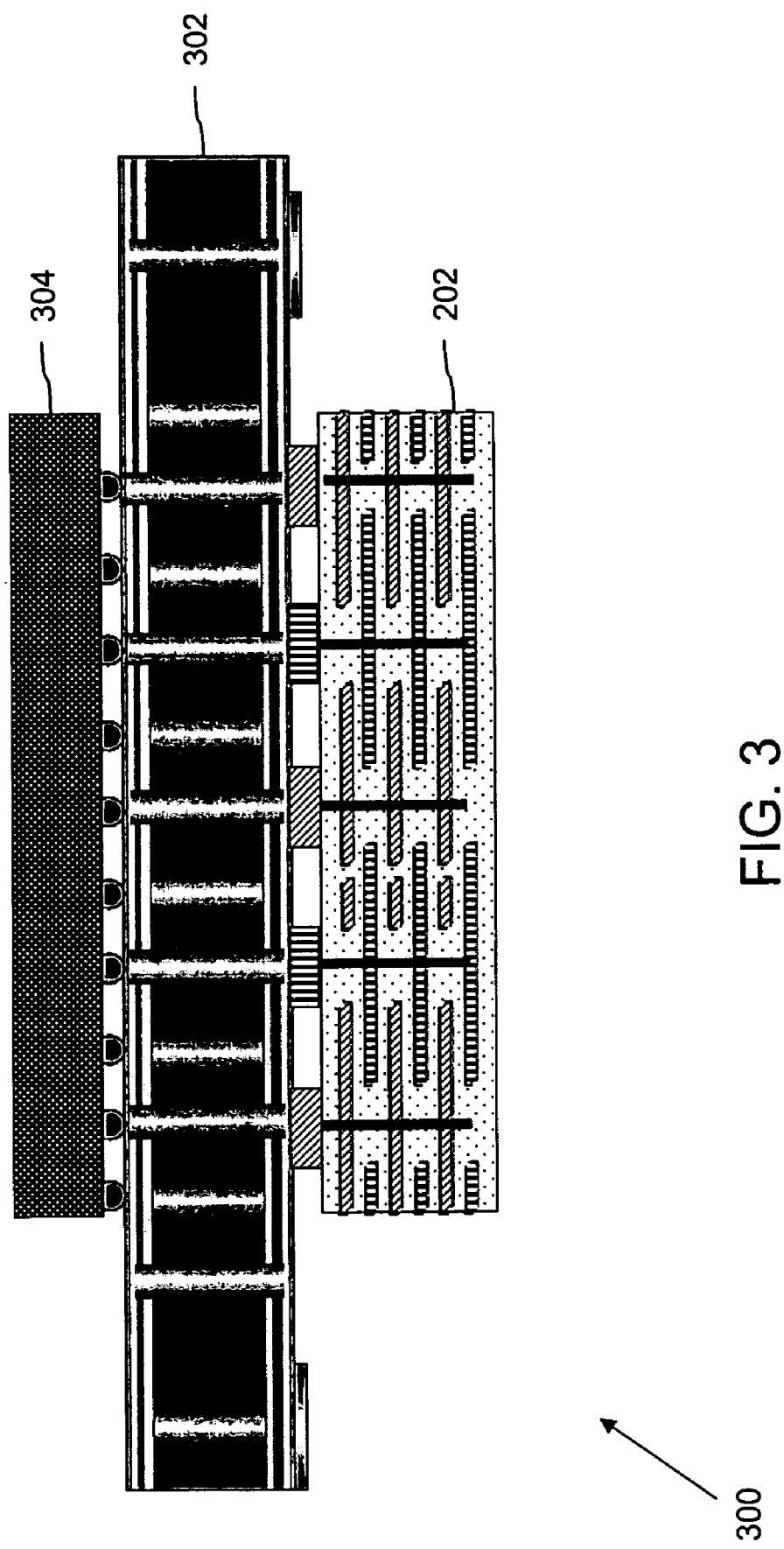
FIG. 3 shows a device, in accordance with an embodiment of the invention.

FIG. 3 shows a device 300, in accordance with an embodiment of the invention. Device 300 includes a package 302, an Integrated Circuit (IC) die 304 and array capacitor 202.

Package 302 may be a ceramic, organic, and/or other suitable material including a physical interface for receiving IC die 304. In various embodiments of the invention, package 302 is a surface-mountable substrate such as an organic land grid array substrate. Package 302 may be mounted directly onto a motherboard or mounted on a pinned interposer which mates with a socket of a motherboard. Packaging systems other than those mentioned herein may be used in conjunction with various embodiments of the invention.

In an embodiment of the invention, IC die 304 comprises a microprocessor chip having a silicon substrate. Further, IC die 304 may include conductive IC die pads, which may comprise gold-plated copper contacts. One or more of conductive IC die pads may be electrically coupled to electrical circuitry that is integrated into IC die 304.

In an embodiment of the invention, array capacitor 202 is assembled on land-side of package 302 under the shadow of IC die 304. In another embodiment of the invention, array capacitor 202 is assembled on land-side of package 302 under the shadow of IC die 304 such that vias 110 of array capacitor 202 are aligned with the vias of package 302.

Exemplary power-plane-sections for a device such as a semiconductor device may be Input/Output (I/O) power section, core power section, cache power section, analog power section and so forth. In an embodiment of the invention, the arrangement of the power-plane-sections of power planes 206 matches the layout of IC die 304. This is further explained in conjunction with FIG. 4. In another embodiment of the invention, the arrangement of the power-plane-sections of power planes 206 does not match the layout of IC die 304 so as to decrease or lower the capacitance of a power-plane-section.

Figure 4A:
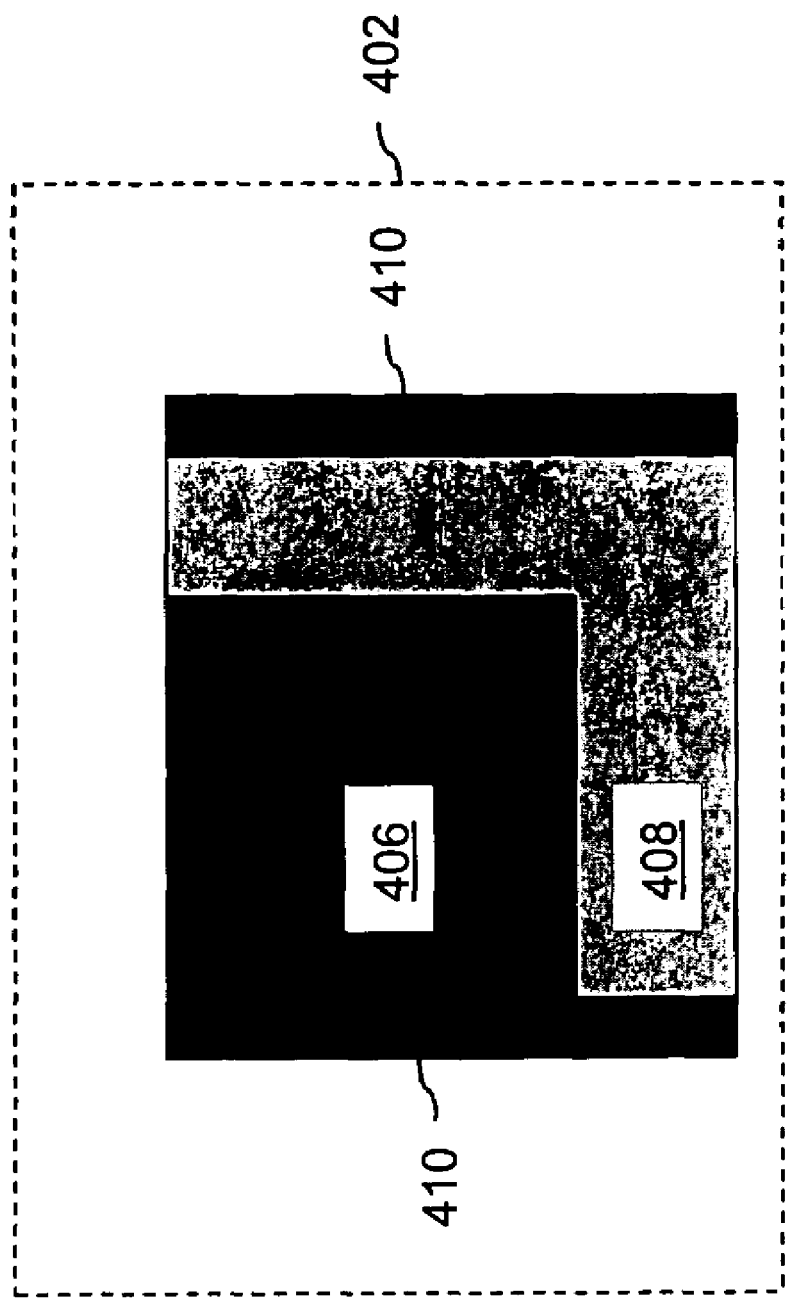
FIGS. 4A and 4B show an Integrated Circuit (IC) die layout and corresponding top view of a power plane, in accordance with an exemplary embodiment of the invention.
Figure 4B:
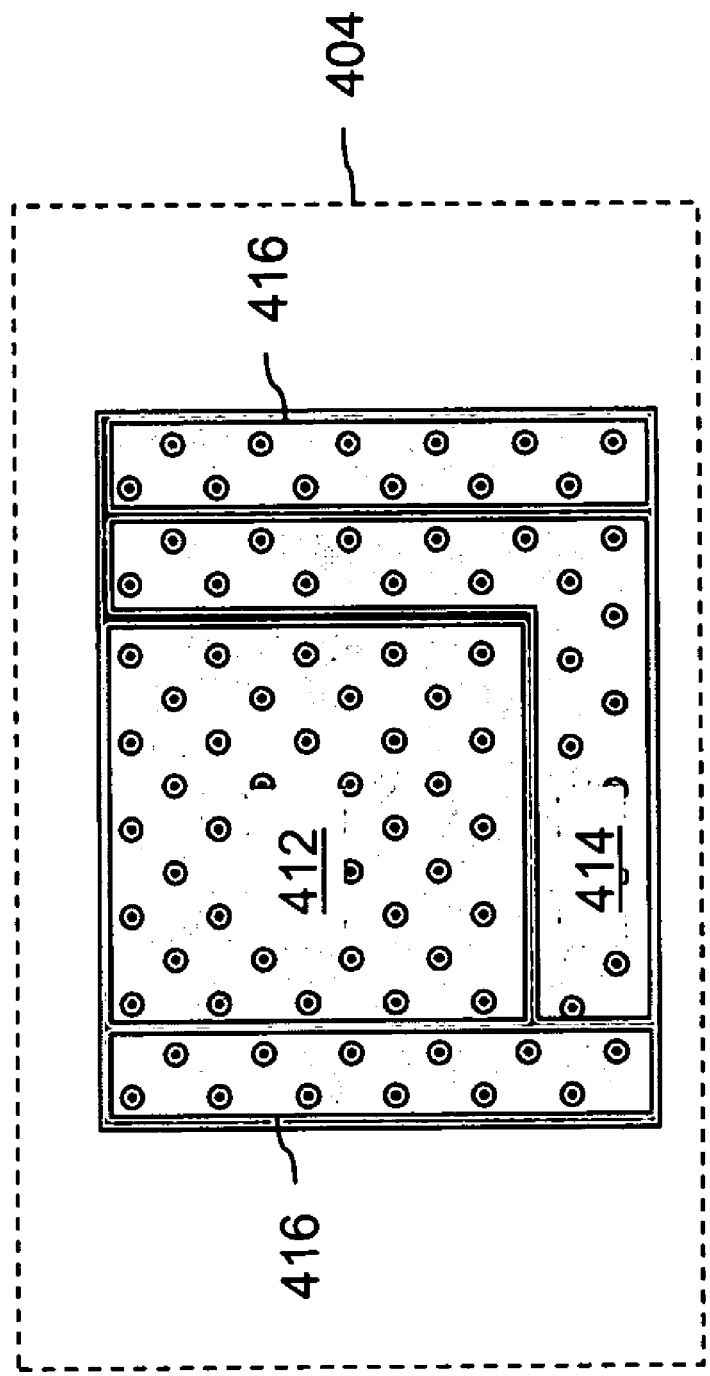

FIGS. 4A and 4B show an IC die layout 402 and corresponding top view 404 of power plane 206, in accordance with an exemplary embodiment of the invention. IC die layout 402 (shown in FIG. 4A) includes a core power IC die region 406, a cache power IC die region 408, and an I/O power IC die region 410.

Top view 404 of power plane 206 (shown in FIG. 4B) includes a power-plane-section 412, a power-plane-section 414, and power-plane-section 416. These power-plane-sections are used to decouple different voltage rails. In this exemplary embodiment of the invention, IC die layout 402 matches the arrangement of power-plane-sections. As a result, power-plane-section 412 in top view 404 of power plane 206 corresponds to core power. Similarly, power-plane-section 414 corresponds to cache power and power-plane-section 416 corresponds to I/O power.

Various embodiments of the invention provide an array capacitor that eliminates the use of multiple array capacitors. The use of a single array capacitor, in comparison to the use of multiple discrete capacitors or multiple array capacitors, lowers Effective Series Inductance (ESL), resulting in better performance.

While the various embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. An array capacitor comprising:
    a. a plurality of ground planes inside a dielectric substrate, each ground plane comprising a plurality of ground-plane-sections, wherein the plurality of ground-plane-sections are independent sheets, the ground-plane-sections being mutually electrically isolated;
    b. a plurality of ground vias, the ground vias electrically connecting the ground planes together, the ground vias being connected to ground terminals of the array capacitor to enable electrical coupling between the ground planes and the ground terminals;
    c. a plurality of power planes inside the dielectric substrate, the power planes and the ground planes being arranged alternately inside the dielectric substrate, each power plane comprising a plurality of power-plane-sections, wherein the plurality of power-plane-sections are independent sheets, the power-plane-sections being mutually electrically isolated; and
    d. a plurality of power vias, the power vias electrically connecting the power planes together, the power vias being connected to power terminals of the array capacitor to enable electrical coupling between the power planes and power terminals.

2. The array capacitor according to claim 1, wherein the independent sheets are selected from a group consisting of metal sheets and alloy sheets.

3. The array capacitor according to claim 1, wherein the plurality of power-plane-sections are at different voltages.

4. The array capacitor according to claim 1, wherein the plurality of power-plane-sections are each at the same voltage.

5. The array capacitor according to claim 1, wherein the ground-plane-sections are substantially aligned with at least one corresponding power-plane-section.

6. The array capacitor according to claim 1, wherein, the independent sheets are selected from a group consisting of metal sheets and alloy sheets.

7. The array capacitor according to claim 1, wherein the dielectric substrate comprises a hi-k ceramic substrate.

8. The array capacitor according to claim 1, wherein the plurality of power planes includes a first power plane having a first area and a second power plane having a second area, the first area being different from the second area.

9. A device comprising:
    a. an Integrated Circuit (IC) die;
    b. a package; and
    c. an array capacitor, the array capacitor and the IC die being placed on either sides of the package, the array capacitor comprising:
        i. a plurality of ground planes inside a dielectric substrate, each ground plane comprising a plurality of ground-plane-sections, wherein the plurality of ground-plane-sections are independent sheets, the ground-plane-sections being mutually electrically isolated;
        ii. a plurality of ground vias, the ground vias electrically connecting the ground planes together, the ground vias being connected to ground terminals of the array capacitor to enable electrical coupling between the ground planes and the ground terminals;
        iii. a plurality of power planes inside the dielectric substrate, the power planes and the ground planes being arranged alternately inside the dielectric substrate, each power plane comprising a plurality of power-plane-sections, wherein the plurality of power-plane-sections are independent sheets, the power-plane-sections being mutually electrically isolated; and iv. a plurality of power vias, the power vias electrically connecting the power planes together, the power vias being connected to power terminals of the array capacitor to enable electrical coupling between the power planes and power terminals.

10. The device according to claim 9, wherein the arrangement of the power-plane-sections matches with the layout of the IC die.

11. The device according to claim 9, wherein the arrangement of the power-plane-sections is different from the layout of the IC die.

12. The device according to claim 9, wherein the independent sheets are selected from a group consisting of metal sheets and alloy sheets.

13. The device according to claim 9, wherein the plurality of power-plane-sections are at different voltages.

14. The device according to claim 9, wherein the plurality of power-plane-sections are each at the same voltage.

15. The device according to claim 9, wherein the ground-plane-sections are substantially aligned with at least one corresponding power-plane-section.

16. The device according to claim 9, wherein the independent sheets are selected from a group consisting of metal sheets and alloy sheets.

17. The device according to claim 9, wherein the plurality of power-plane-sections comprise at least one Input/Output (I/O) power section.

18. The device according to claim 9, wherein the plurality of power-plane-sections comprise at least one core power section.

19. The device according to claim 9, wherein the plurality of power-plane-sections comprise at least one cache power section.

20. The array capacitor according to claim 9, wherein the plurality of power planes includes a first power plane having a first area and a second power plane having a second area, the first area being different from the second area.

21. A device comprising:
a. an Integrated Circuit (IC) die;
b. a package; and
c. an array capacitor, the array capacitor and the IC die being placed on either sides of the package, the array capacitor comprising:
  i. a plurality of ground planes inside a dielectric substrate each ground plane comprising a plurality of ground-plane-sections, wherein the plurality of ground-plane-sections are independent sheets, the ground-plane-sections being mutually electrically isolated;
  ii. a plurality of ground vias, the ground vias electrically connecting the ground planes together, the ground vias being connected to ground terminals of the array capacitor to enable electrical coupling between the ground planes and the ground terminals;
  iii. a plurality of power planes inside the dielectric substrate, the power planes and the ground planes being arranged alternately inside the dielectric substrate, each power plane comprising a plurality of power-plane-sections, the power-plane-sections being mutually electrically isolated, the plurality of power-plane-sections being independent sheets, the independent sheets being selected from a group consisting of metal sheets and alloy sheets; and
  iv. a plurality of power vias, the power vias electrically connecting the power planes together, the power vias being connected to power terminals of the array capacitor to enable electrical coupling between the power planes and power terminals.

22. The device according to claim 21, wherein the plurality of power-plane-sections are at different voltages.

23. The device according to claim 21, wherein the plurality of power-plane-sections are each at the same voltage.

24. The device according to claim 21, wherein the arrangement of the power-plane-sections matches with the layout of the IC die.

25. The device according to claim 21, wherein the arrangement of the power-plane-sections is different from the layout of the IC die.

26. The device according to claim 21, wherein the ground-plane-sections are substantially aligned with at least one corresponding power-plane-section.

27. The device according to claim 21, wherein the plurality of power-plane-sections comprise at least one Input/Output (I/O) power section.

28. The device according to claim 21, wherein the plurality of power-plane-sections comprise at least one core power section.

29. The device according to claim 21, wherein the plurality of power-plane-sections comprise at least one cache power section.

30. The array capacitor according to claim 21, wherein the plurality of power planes includes a first power plane having a first area and a second power plane having a second area, the first area being different from the second area.

* * * * *